United States Patent
Walz et al.

(10) Patent No.: US 9,156,119 B2
(45) Date of Patent: Oct. 13, 2015

(54) MACHINE TOOL

(75) Inventors: Jürgen Walz, Frickenhausen (DE); Franco Rigolone, Ponteranica (IT); Gottfried Deuringer, Geretsried (DE); Renato Rota, Carvico (IT); Manuel Gerst, Bielefeld (DE)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 77 days.

(21) Appl. No.: 14/122,949

(22) PCT Filed: May 18, 2012

(86) PCT No.: PCT/EP2012/059287
§ 371 (c)(1),
(2), (4) Date: May 22, 2014

(87) PCT Pub. No.: WO2012/163699
PCT Pub. Date: Dec. 6, 2012

(65) Prior Publication Data
US 2014/0251097 A1      Sep. 11, 2014

(30) Foreign Application Priority Data

May 31, 2011   (DE) .......................... 10 2011 076 837

(51) Int. Cl.
*B23Q 39/02*    (2006.01)
*B23B 3/30*     (2006.01)
(Continued)

(52) U.S. Cl.
CPC ................ *B23Q 39/02* (2013.01); *B23B 3/168* (2013.01); *B23B 3/30* (2013.01); *B23B 29/242* (2013.01);
(Continued)

(58) Field of Classification Search
CPC ........ B23B 3/167; B23B 3/30; B23Q 39/026; B23Q 39/028; B23Q 1/01
USPC ........................................................... 82/117
See application file for complete search history.

(56) References Cited

U.S. PATENT DOCUMENTS 5,127,140 A * 7/1992 Oiwa et al. .................... 29/27 C
6,640,677 B2 * 11/2003 Ueda et al. ..................... 82/129
(Continued)

FOREIGN PATENT DOCUMENTS

DE      279 429 A1    6/1990
DE    195 28 404 A1   2/1997
(Continued)

OTHER PUBLICATIONS

DE 10 2011 076 835.1—German Office Action with English translation, issued Jun. 12, 2012, 11 pages.
(Continued)

*Primary Examiner* — Will Fridie, Jr.
(74) *Attorney, Agent, or Firm* — Blakely Sokoloff Taylor & Zafman LLP

(57) ABSTRACT

The present invention relates to a machine tool, in particular to a lathe, comprising a machine frame 1, a first work spindle 21 which is arranged on a spindle carrier face of the machine frame 1 and is to receive a first workpiece W1, a second work spindle 22 which faces the first work spindle 21, is arranged on a spindle carrier face of the machine frame 1 and is to receive a second workpiece W2, the axis of the second work spindle 22 being aligned parallel, in particular coaxially to the axis of the first work spindle 21, and comprising two movable tool carrier slides 51 and 52, on which a respective tool-carrying tool carrier 61 and 62 is arranged. According to the invention, provided between the work spindles 21 and 22 is a tool carrier 62 which can be moved transversely to the spindle axes, is configured as a tool turret and the turret axis of which is aligned transversely to the spindle axes.

16 Claims, 4 Drawing Sheets

(51) Int. Cl.
  *B23B 3/16* (2006.01)
  *B23B 29/24* (2006.01)
  *B23Q 39/00* (2006.01)

(52) U.S. Cl.
  CPC ........ *B23Q 39/026* (2013.01); *B23Q 2039/004* (2013.01); *B23Q 2039/006* (2013.01); *B23Q 2039/008* (2013.01); *Y10T 82/2508* (2015.01)

(56) References Cited

U.S. PATENT DOCUMENTS

| | | | | |
|---|---|---|---|---|
| 6,758,117 | B2 * | 7/2004 | Baumann et al. | 82/117 |
| 6,812,664 | B2 * | 11/2004 | Fujinawa | 318/560 |
| 7,266,871 | B2 * | 9/2007 | Takeuchi et al. | 29/27 C |
| 7,451,533 | B2 * | 11/2008 | Kawasumi et al. | 29/27 C |
| 8,297,158 | B2 | 10/2012 | Watanabe et al. | |

FOREIGN PATENT DOCUMENTS

| | | | |
|---|---|---|---|
| DE | 19 959 961 | A1 | 6/2001 |
| DE | 10 116 994 | A1 | 10/2002 |
| DE | 10 200 60 15078 | A1 | 11/2006 |
| DE | 10 2006 013 783 | A1 | 12/2006 |
| DE | 10 2006 026 184 | A1 | 12/2007 |
| DE | 10 2011 076 834 | | 12/2012 |
| EP | 0 999 002 | A1 | 5/2000 |
| EP | 1 160 052 | A1 | 12/2001 |
| EP | 1 897 640 | A1 | 3/2008 |

OTHER PUBLICATIONS

DE 10 2011 076 834.3—German Office Action with English translation, issued Jun. 14, 2012, 11 pages.
DE 10 2011 077 571.4—German Examination Report with English translation, dated Jun. 15, 2012, 8 pages.
PCT/EP2012/059282; English translation of International Preliminary Report on Patentability, issued Dec. 2, 2013, 6 pages.
PCT/EP2012/059284; English translation of International Preliminary Report on Patentability, issued Dec. 2, 2013, 9 pages.
PCT/EP2012/059292; English translation of International Preliminary Report on Patentability, issued Dec. 2, 2013, 11 pages.
DE 10 2011 076 837.8—German Examination Report with English translation, dated Jun. 12, 2012, 13 pages.
PCT/EP2012/059287; International Search Report and English translation of Written Opinion, mail date Aug. 10, 2012, 19 pages.
PCT/EP2012/059287; English translation of International Preliminary Report on Patentability, issued Dec. 2, 2013, 12 pages.

* cited by examiner

MACHINE TOOL

CROSS-REFERENCE TO RELATED APPLICATIONS

This application is the U.S. National Stage entry under 35 U.S.C. §371 of international application PCT/EP2012/059287, filed 18 May 2012, which in turn claims priority to German patent application DE 10 2011 076 837.8, filed 31 May 2011.

The present invention relates to a machine tool, in particular a lathe, having a machine frame, a first work spindle, arranged on a first carrier portion of the machine frame, for receiving a first workpiece, a second work spindle, facing the first work spindle and arranged on a second carrier portion of the machine frame, for receiving a second workpiece, the spindle axis of the second work spindle being aligned parallel to, in particular coaxial with, the spindle axis of the first work spindle, and at least two displaceable tool carrier slides on each of which a tool-carrying tool carrier is arranged.

BACKGROUND OF THE INVENTION

Generic machine tools comprise a machine frame on which at least two mutually facing, rotatably mounted work spindles having parallel or coaxial spindle axes are provided, it being possible for workpieces to be respectively received on the work spindles in order to be machined on the machine tool. To prepare the tools for machining, at least two tool carriers are provided which are arranged on movable tool slides, in particular on compound slides positioned on the machine frame and which can be moved relative to the work spindles by one or more linear axes (for example they can be moved in the X, Y and/or Z direction). Generic machine tools of this type are known, for example, from DD 279 429 A1 and also from EP 0 999 002 A1.

Generic machine tools of this type generally need to be prepared such that it is possible to efficiently machine the workpieces with as many tools as possible which can be used as far as possible at the same time, with the greatest possible flexibility in respect of the control of the relative movements between the tools and the tools received in the work spindles, at the same time with a compact and economical construction of the machine tool and with a machining space which affords the machinist or operator of the machine tool with the best possible visibility.

The object of the invention is therefore to improve a machine tool of the generic type such that it is possible to efficiently machine the workpieces with as many tools as possible which can be used as far as possible at the same time, with the greatest possible flexibility in respect of the control of the relative movements between the tools and the tools received in the work spindles, at the same time with a compact and economical construction of the machine tool and with a machining space which affords the machinist or operator of the machine tool with the best possible visibility.

SUMMARY OF THE INVENTION

To achieve the above-mentioned object, according to the present invention, a machine tool according to the independent claim 1 is proposed. Dependent claims relate to preferred configurations of the machine tool according to the present invention.

The present invention is based on the idea of providing a compact and flexible-machining construction of the machine tool and of the machine frame, in which, provided between two carrier portions of the machine frame which each support one of the work spindles and at least one of which supports a tool carrier slide, is a centre portion of the machine frame on which a tool carrier slide which can be moved transversely to the spindle axes and which carries a tool turret having a turret axis transverse to the spindle axes is provided between the work spindles.

The configuration of the tool carrier as a tool turret arranged between the work spindles advantageously makes it possible to provide a plurality of tools between the work spindles and, due to the arrangement between the work spindles, it is possible to simultaneously provide a plurality of tools for both work spindles without moving the slide carrying the turret by a great distance.

A construction of the machine tool and machine frame of this type which can advantageously be provided in a compact manner affords the particular further advantage that a first workpiece received on the first work spindle can be machined by a first tool, while a second workpiece received on the second work spindle can be machined by a second tool on the opposite side of the head of the tool turret merely by means of the tool-carrying turret, arranged between the two work spindles, due to this purposeful arrangement between the two work spindles with a turret axis transverse to the spindle axes.

Consequently, according to the invention it is possible to achieve a fast and efficient successive machining of a first workpiece received on the first work spindle and of a second workpiece received on the second work spindle, since possibly no additional tool alignments, or at least only slight additional tool alignments by rotation of the turret head are necessary and furthermore, in many machining steps it is even possible to machine the first and second workpiece simultaneously in each case by means of the first and second tools.

To recapitulate, the configuration of the tool carrier as a tool turret allows an extremely expedient and advantageous simultaneous alignment of two tools respectively on one of the work spindles with only one tool carrier provided between the work spindles, due to the arrangement in which the turret can be rotated about a turret axis transverse to the spindle axes. Constructions with a total of two tool carriers, at the same time with a compact structure of the machine tool and machine frame allow at least a simultaneous alignment of three tools with respect to the workpiece and a total of three or more tool carriers, at the same time with a compact structure of the machine tool and machine frame, allow at least a simultaneous alignment of four or more tools with respect to the workpiece.

Furthermore, the arrangement of the tool turret between the spindles with a turret axis transverse to the spindle axes can also allow a significantly improved visibility into the working area of the machine tool for the machinist, since with a lateral visibility of both work spindles, the machinist can see more tools which are provided and are available on the tool turret than in the case of prior art arrangements of tool turrets which are arranged to the side of the work spindles with turret axes aligned parallel or substantially parallel to the spindle axes. Particularly advantageously, an excellent visibility into the machining space and of the tool turret can be provided in embodiments in which the spindle axes are aligned substantially horizontally and the axis of the tool turret, arranged between the spindle axes, is aligned substantially horizontally, but transversely, in particular vertically to the spindle axes. The viewing direction into a unilaterally open machining space can then be aligned in the direction of the turret axis, so that all the tools around the periphery of the tool turret and workpieces on both spindles can be seen.

According to the present invention, with regard to the fundamental inventive concept described above, a machine tool, in particular a lathe is proposed which comprises a machine frame with a first carrier portion, a second carrier portion and a centre carrier portion arranged between the first and second carrier portions. The first carrier portion has a first tool carrier face, the second carrier portion has a second tool carrier face and the centre portion has a third tool carrier face. The first tool carrier face of the first carrier portion and the second tool carrier face of the second carrier portion are arranged on a same first face of the machine frame, in particular preferably on the upper face of the machine frame, and the third tool carrier face of the centre portion is arranged on a second face of the machine frame, in particular preferably on the front of the machine frame, which is preferably visible to the machinist. The first face of the machine frame can be arranged vertically or obliquely, for example, to the second face of the machine frame.

The machine tool according to the invention further comprises a first work spindle which is arranged on the first carrier portion and is to receive a first workpiece, and comprises a second work spindle which faces the first work spindle, is arranged on the second carrier portion and is to receive a second workpiece. The spindle axis of the second work spindle is aligned parallel, in particular coaxially to the spindle axis of the first work spindle or can be aligned parallel, in particular coaxially to the spindle axis of the first work spindle at least by moving at least one of the work spindles. Furthermore, the first carrier portion of the machine frame preferably comprises a first spindle carrier face on which the first work spindle is arranged, and furthermore the second carrier portion preferably comprises a second spindle carrier face on which the second work spindle is arranged. In this respect, the first and second spindle carrier faces are preferably arranged on the same second face of the machine frame as the third tool carrier face of the centre portion in favour of a very compact construction.

The machine tool according to the invention further comprises at least two tool carrier units, namely a tool carrier unit comprising a first tool carrier slide which is arranged on the first tool carrier face of the first carrier portion or on the second tool carrier face of the second carrier portion and on which a first tool carrier is arranged, and a tool carrier unit comprising a second tool carrier slide which is arranged on the third tool carrier face of the centre portion and on which a second tool carrier is arranged.

According to the invention, the second tool carrier slide can be moved in a first direction transversely, in particular vertically to the spindle axes of the first and second work spindles. According to the invention, the second tool carrier is configured as a tool turret, arranged between the first work spindle and the second work spindle, and comprises a tool-carrying turret head which is mounted rotatably about a turret axis. According to the invention, the turret axis is aligned transversely, in particular vertically to the spindle axes of the first and second work spindles.

In summary, the present invention makes it possible to improve a machine tool of the generic type such that it is possible to efficiently machine the workpieces with as many tools as possible which can be used as far as possible at the same time, with the greatest possible flexibility in respect of the control of the relative movements between the tools and the tools received in the work spindles, at the same time with a compact and economical construction of the machine tool and with a machining space which affords the machinist with the best possible visibility.

In the following, a description of preferred embodiments of the machine tool described above according to the present invention will be provided.

The turret axis is preferably also aligned transversely, in particular vertically to the first direction of the second tool carrier slide. The axis of the tool turret, arranged between the work spindles is thereby preferably transverse to the spindle axes and is also transverse to the direction of movement of the second tool slide. In this configuration, the visibility into the working area can be further greatly improved, particularly if the spindle carrier faces and the third tool carrier face are configured on the front of the machine frame and furthermore, a particularly compact construction of the tool carrier unit comprising the second tool carrier slide and the second tool carrier configured as a tool turret can be provided when the axis of the turret head is provided transversely, in particular vertically to the direction of movement of the second tool slide.

The turret head preferably has a plurality of mounts for receiving tools or tool-carrying tool holders, the tool turret being arranged to align a mount with one of the work spindles by rotation of the turret head about the turret axis. It is thereby possible to advantageously provide a plurality of tools efficiently between the work spindles, with a compact construction and with only one tool turret, so that it is possible to provide a tool for both work spindles without moving the second tool slide by a great distance.

The mounts on the turret head are preferably arranged at least to some extent in pairs on opposite sides of the turret head such that at least one mount is aligned with the second work spindle when an opposite mount is aligned with the first work spindle. In a particularly effective preferred embodiment of the present invention, the mounts on the turret head are arranged in pairs on opposite sides of the turret head such that a respective mount is aligned with the second work spindle when another opposite mount is aligned with the first work spindle. Advantageously, this makes it possible to align a first tool on the first work spindle and to simultaneously align a second tool, positioned on the other side of the turret head, on the second work spindle, thereby making it possible to successively machine, in a substantially more efficient manner, the first and second workpieces by the turret arranged between the work spindles and, in many machining possibilities, even a particularly efficient simultaneous machining of the first and second workpieces is made possible by means of the turret arranged between the work spindles.

The turret head is preferably configured as a radial turret head, the mounts being arranged over the periphery of the turret head. This provides the advantage that due to the radial arrangement of the mounts for receiving tools or tool-carrying tool holders, the tools can be aligned radially onto the workpiece mounts of the work spindles or onto the spindle axes by rotation about the turret axis.

The turret head is preferably configured as a double or multiple-turret head and, in the case of a double turret head, each individual peripheral mount side of the turret head has two mounts and in the case of a multiple-turret head, has three or more mounts which are arranged next to one another in the direction of the turret axis. It is thereby possible to efficiently provide substantially more tools for both work spindles between the work spindles on the tool turret, with a simple and particularly compact construction.

If the turret head is configured as a double or multiple-turret head, the tools are arranged in tool planes which are respectively vertical to the turret axis. In particular, a double turret head generally comprises two tool planes in which respective tool mounts are arranged, and a multiple-turret head generally comprises three or more tool planes in which respective tool mounts are arranged. These tool planes are preferably arranged such that they are displaced parallel in the direction of the turret axis.

In a preferred embodiment, the different tool planes of the turret head can be controlled independently of one another, so that the double or multiple-turret head comprises at least a first turret head portion with the tools of a first tool plane and a second turret head portion with the tools of a second tool plane, the first turret portion and the second turret portion being arranged next to one another in the turret axial direction and can be rotated independently of one another about the turret axis to align the tools of the first and second tool planes.

In particular, but not exclusively, if the turret head is configured as a double or multiple-turret head, according to a particularly advantageous configuration the turret head can be moved in the direction of the turret axis, particularly by a linear axis in column construction, i.e. with a linear axial column, which is arranged on the second tool slide and extends in the direction of the turret axis. Furthermore, a round axis can expediently be provided, by which the linear column can be controlled in a rotatable manner about the turret axis.

If the turret head is configured as a double or multiple-turret head, the turret head can preferably be moved in the direction of the turret axis such that the tool turret is arranged to align a first or second mount of the mounts arranged next to one another in the direction of the turret axis, of a side of the turret head with one of the work spindles by movement of the turret head in the direction of the turret axis. Moving the turret in the direction of the turret axis makes it possible to align tools of the different tool planes of the turret with the spindle axes.

As an alternative or in addition, it is also possible to provide one or both of the work spindles such that it/they can be moved in the direction of the turret axis. Furthermore, it is also possible to provide work spindles having parallel spindle axes with a distance equal to the distance of the different tool planes of the turret in order to be able to align a first tool plane onto the spindle axis of the first work spindle and to be able to align a second tool plane onto the spindle axis of the second work spindle.

The first and/or the second work spindle can preferably be moved in the direction of the spindle axes. This advantageously makes it possible for workpieces to be transferred from one spindle to the other, for example in the case of a tandem implementation of the front and rear machining of the same workpiece on the two work spindles.

The second tool carrier slide is preferably guided on guide means, in particular on guide rails which are preferably fastened on the third tool carrier face of the centre portion of the machine frame and are preferably aligned in the first direction.

The first tool carrier slide is preferably arranged on the first tool carrier face of the first carrier portion, and the machine tool preferably further comprises a third tool carrier slide which is arranged on the second tool carrier face of the second carrier portion and on which a third tool carrier is arranged. It is thereby possible to further improve the tool provision on the machine tool. In particular, the first tool carrier can provide tools for the first work spindle, the third tool carrier can provide tools for the second work spindle and, due to the advantageous arrangement of the second tool carrier between the spindles, the second tool carrier can provide tools both for the first work spindle and for the second work spindle, even simultaneously if appropriate, as described above.

The first tool carrier slide can preferably be moved parallel or transversely, in particular vertically to the spindle axes and furthermore the third tool carrier slide, if present, can preferably be moved parallel or transversely, in particular vertically to the spindle axes. It is thereby possible to further improve the relative controllable movement possibilities between tools and workpieces. In this respect, the first and/or third tool carrier slide can preferably be configured as a compound slide.

Preferably, the first tool carrier can be moved transversely to the spindle axes in the first direction and/or can be moved transversely to the first direction and transversely to the spindle axes in a second direction. Preferably, the third tool carrier, if present, can also be moved transversely to the spindle axes in the first direction and/or can be moved transversely to the first direction and transversely to the spindle axes in a second direction. It is thereby possible to further improve the relative controllable movement possibilities between tools and workpieces. In this respect, the first, second and/or third tool carrier slide can preferably be configured as a compound slide.

The first tool carrier is preferably configured as a tool turret which comprises a tool-carrying turret head, mounted rotatably about a turret axis aligned parallel to the spindle axes and the third tool carrier, if present, is preferably also configured as a tool turret which comprises a tool-carrying turret head, mounted rotatably about a turret axis aligned parallel to the spindle axes. Since each turret is arranged to provide a plurality of tools, the provision of tools on the machine tool can be further improved hereby.

The first tool carrier face of the first carrier portion and the second tool carrier face of the second carrier portion preferably substantially span a first plane and the first spindle carrier face of the first carrier portion and the second spindle carrier face of the second carrier portion preferably span a second plane, the first plane preferably being aligned substantially vertically or obliquely to the second plane. It is thereby possible to provide a particularly purposeful construction of the machine frame with two planes standing vertically or obliquely relative to one another, it being possible to use the face of the machine frame of one plane as a spindle carrier face and to use the face of the machine frame of the other plane as a tool carrier face for the first and/or third tool carrier slide. In this respect, it is not absolutely necessary for the basic body of the machine frame to have precisely planar faces which span the mentioned planes. Instead, the above-mentioned planes can be understood in a more abstract manner than geometric planes which substantially correspond to the faces of the machine frame or are substantially spanned by the respective faces of the machine frame or at least in which the movement planes of the slides are located, which planes are formed or spanned, for example, by guide rails of the slides.

The third tool carrier face of the centre portion preferably substantially spans a third plane aligned parallel to the second plane, the third plane preferably being indented towards the machine frame relative to the second plane. It is thereby possible to provide, in a particularly purposeful and compact manner, a machine frame construction or machine frame assembly in which the second tool slide for the second tool carrier can be arranged in a compact manner in a recess between the work spindles or between the carrier portions of the machine frame. Furthermore, an effectively visible machining space which is open in the viewing direction or is open on one side can be created between the carrier portions in a simple and compact fashion. Furthermore, when the carrier portions are aligned vertically, the spindle axes being aligned horizontally and the first direction substantially extending vertically between the carrier portions, a particularly expedient collection channel for chips can be created under the work spindles and the tool carrier in this construction.

Furthermore, machining space walls are preferably provided which are arranged on those faces of the first and second carrier portions which extend between the spindle carrier faces of the carrier portions and the third tool carrier face of the centre portion. In this respect, these faces preferably extend vertically to the first and second planes, irrespective of the preferred provision of machining space walls.

The machining walls preferably form a machining space between the carrier portions of the machine frame. The machining walls also preferably extend in the first direction beyond the body of the machine frame, i.e. preferably beyond the first plane of the first and second tool carrier faces. In this respect, the machining walls preferably have openings, through which the first and second work spindles, the first tool carrier and/or the third tool carrier, if present, extend into the machining space. Advantageously, this makes it possible to protect the housings and, if appropriate, slides of the work spindles and/or the first and optionally the third tool carrier slide against chips from the machining space, without necessitating expensive protective covers for the slides and housing.

In the following, the aforementioned aspects and further advantageous aspects of the present invention will be described with reference to the accompanying figures and preferred embodiments of the present invention.

DETAILED DESCRIPTION OF PREFERRED EMBODIMENTS OF THE PRESENT INVENTION

Figure 1:
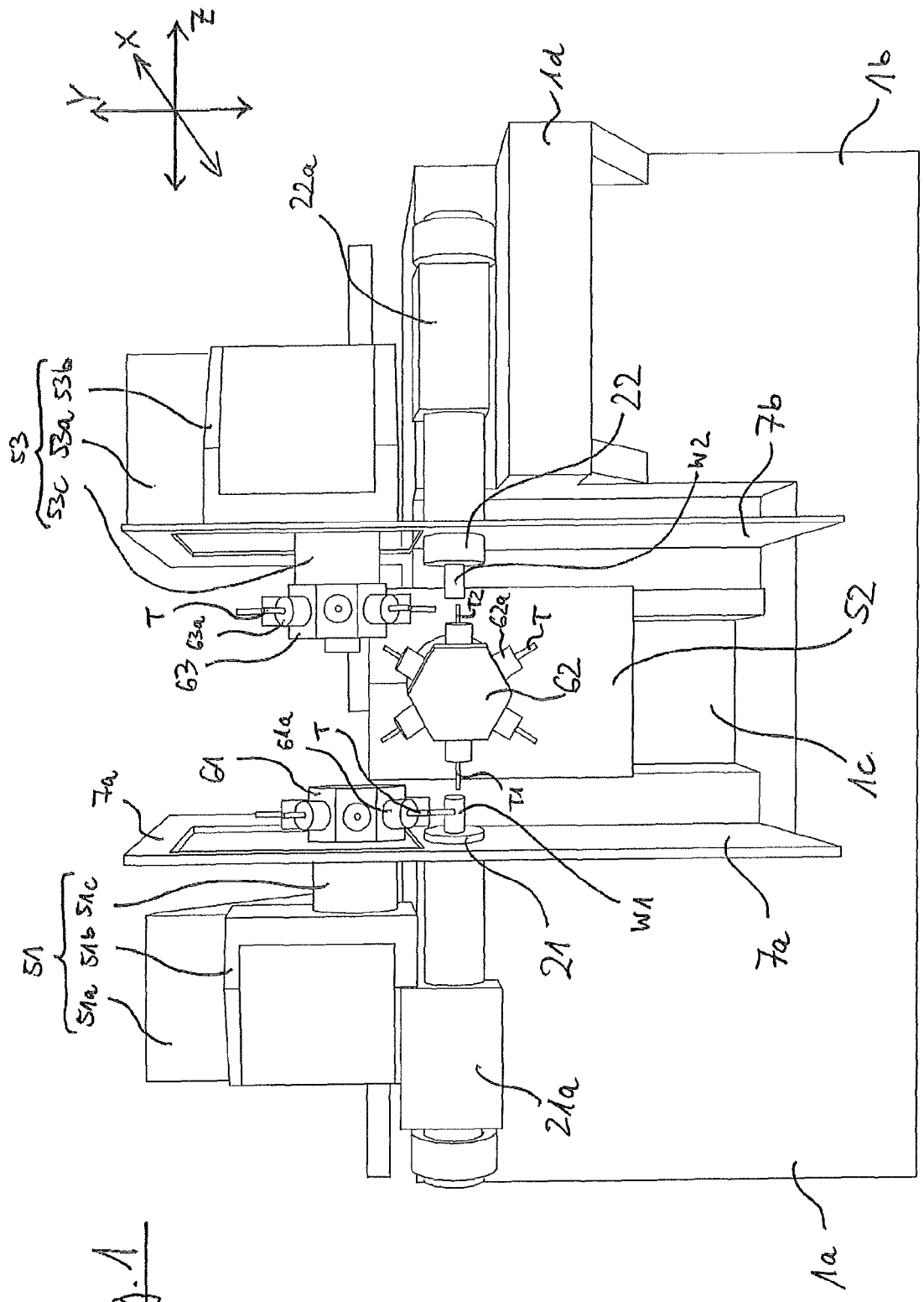
FIG. 1 shows by way of example a schematic illustration of a front view of a machine tool according to a preferred embodiment of the present invention.

In the following, a detailed description of preferred embodiments of the present invention will be provided with reference to the accompanying figures. However, the present invention is not restricted to the described embodiments. The present invention is defined by the scope of the claims. Identical or similar features of the embodiments are identified in the figures by the same reference numerals.

FIG. 1 shows by way of example a schematic illustration of a front view of a machine tool according to a preferred embodiment of the present invention. The machine tool according to FIG. 1 is a lathe having a machine frame 1 which comprises a first carrier portion 1a, a second carrier portion 1b and a centre portion 1c arranged between the first and second carrier portions 1a and 1b.

Figure 2:
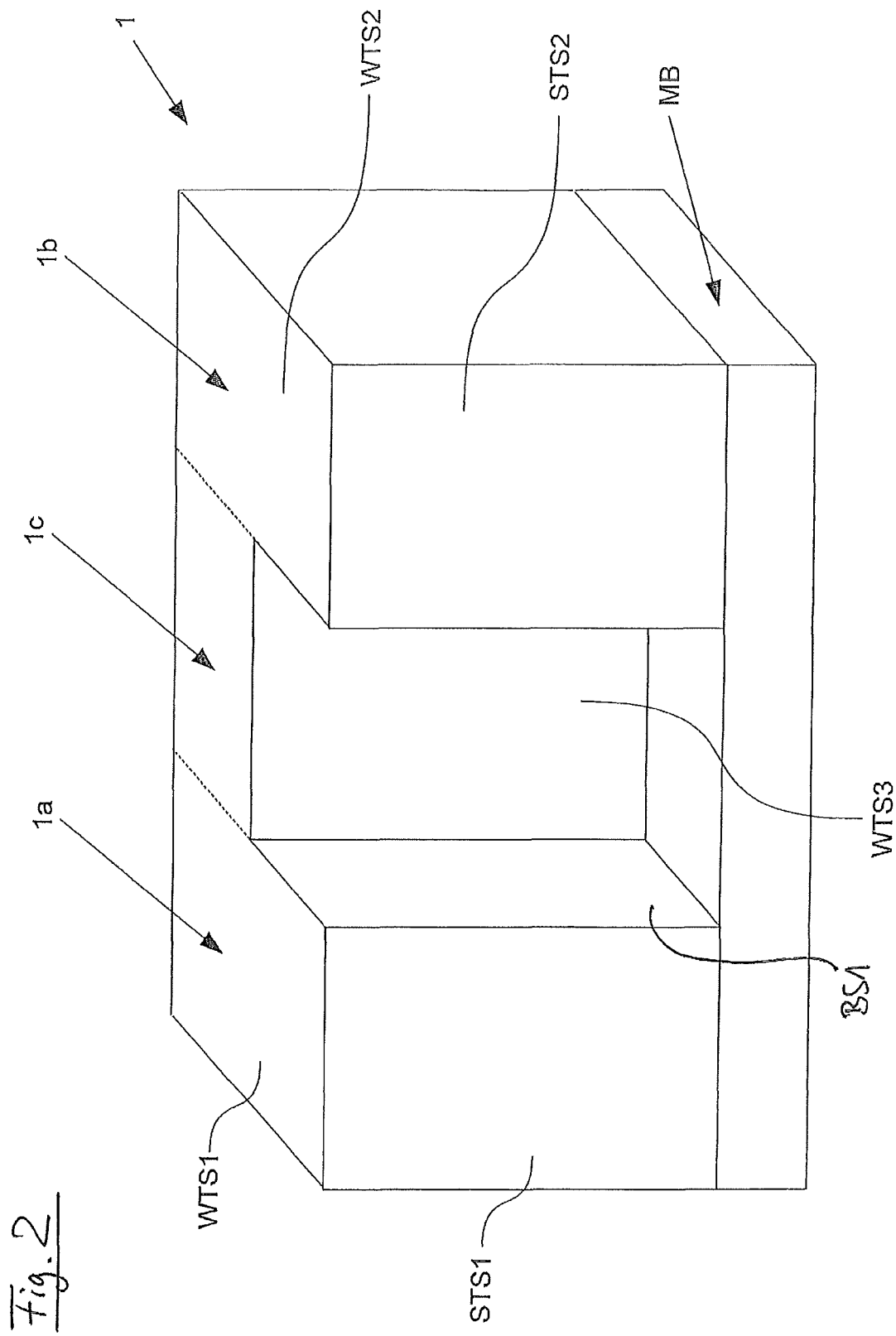
FIG. 2 shows by way of example a schematic illustration of a perspective view of the machine frame construction of the machine tool according to the preferred embodiment of the present invention from FIG. 1.

FIG. 2 shows by way of example a schematic illustration of a perspective view of the machine frame construction of the machine tool according to the preferred embodiment of the present invention from FIG. 1. As shown in FIG. 2, the first carrier portion 1a has, by way of example, a first spindle carrier face STS1 and a first tool carrier face WTS1 which are substantially positioned in planes vertical to one another. Analogously to the first carrier portion 1a, the second carrier portion 1b has, by way of example, a second spindle carrier face STS2 and a second tool carrier face WTS2 which are substantially positioned in planes vertical to one another.

According to FIG. 2, the first tool carrier face WTS1 of the first carrier portion 1a and the second tool carrier face WTS2 of the second carrier portion 1b substantially span a first plane, and the first spindle carrier face STS1 of the first carrier portion 1a and the second spindle carrier face STS2 of the second carrier portion 1b substantially span a second plane, the first plane being aligned substantially vertically to the second plane.

According to the configuration of FIG. 2, the first tool carrier face WTS1 of the first carrier portion 1a and the second tool carrier face WTS2 of the second carrier portion 1b are arranged on the upper face of the machine frame 1, and the first spindle carrier face STS1 of the first carrier portion 1a and the second spindle carrier face STS2 of the second carrier portion 1b are arranged on the front of the machine frame 1. On the lower face, the machine frame has a machine base portion MB which has a positioning surface for the machine tool.

The centre portion 1c of the machine frame 1, arranged between the carrier portions 1a and 1b has a third tool carrier face WTS3. The third tool carrier face WTS3 of the centre portion 1c substantially spans a third plane which is aligned parallel to the second plane of the first and second spindle carrier faces STS1 and STS2, the third plane being indented towards the machine frame 1 relative to the second plane of the first and second spindle carrier faces STS1 and STS2, i.e. in particular is moved parallel towards the machine frame 1.

The first tool carrier face WTS1 of the first carrier portion 1a and the second tool carrier face WTS2 of the second carrier portion 1b are arranged on the upper face of the machine frame 1, and the first spindle carrier face STS1 of the first carrier portion 1a, the second spindle carrier face STS2 of the second carrier portion 1b and the third tool carrier face WTS3 of the centre portion 1c are arranged on the front of the machine frame 1.

Extending between the first and second spindle carrier faces STS1 and STS2 of the carrier portions 1a and 1b and the third tool carrier face WTS3 of the centre portion 1c are respective machining space faces (see, for example, face BS1 in FIG. 2) which are aligned, by way of example, vertically to the first plane of the first and second tool carrier faces WTS1 and WTS2 of the carrier portions 1a and 1b and are aligned vertically to the second plane of the first and second spindle carrier faces STS1 and STS2 of the carrier portions 1a and 1b. The machining space walls define, together with the third tool carrier face WTS3, an indentation in the machine frame 1 which can advantageously define a machining space in the machine tool or furthermore, in the case of a vertical alignment as in FIG. 2, can define a collection channel for chips.

In this embodiment, the carrier portions 1a to 1c are interconnected, but in other embodiments of the invention, they can also be separate from one another.

Reference will again be made in the following to FIG. 1 for a more precise description of the machine tool according to this embodiment. The machine tool comprises a first work spindle 21 which is arranged on the first spindle carrier face STS1 of the first carrier portion 1a, is held in a spindle housing 21a and is to receive a first workpiece W1, and the machine tool comprises a second work spindle 22 which faces the first work spindle 21, is arranged on the second spindle carrier face STS2 of the second carrier portion 1b and is to receive a second workpiece W2. The second work spindle 22 is held in a spindle housing 22a.

In this embodiment, the spindle axis of the second work spindle 22 is aligned coaxially to the spindle axis of the first work spindle 21, but it can also be aligned parallel, but not coaxially, or can be aligned parallel and can be aligned coaxially by displacement.

In this embodiment, the second work spindle 22 is arranged on a spindle carriage, guided on guide means, and can be moved in direction Z, parallel to the spindle axes.

In this embodiment, the guide means (not shown) run by way of example on the spindle carrier face STS2 of the second carrier portion 1b, but alternatively they can also be arranged on a projecting portion 1d of the machine frame 1, which projecting portion 1d can be arranged on the spindle carrier face of the second carrier portion 1b. Analogously, embodiments can also be provided in which the first spindle 21 or both work spindles 21 and 22 can be moved in the direction of the spindle axes.

The machine tool further comprises a first tool carrier slide 51 which is arranged on the first tool carrier face WTS1 of the first carrier portion 1a and on which a first tool carrier 61 is arranged, and the machine tool comprises a third tool carrier slide 53 arranged on the second tool carrier face WTS2 of the second carrier portion 1b and on which a third tool carrier 63 is arranged.

In this embodiment, the first and third tool carriers 61 and 63 are configured as tool turrets which each comprise a tool-carrying turret head mounted rotatably about a turret axis aligned parallel to the spindle axes. However, instead of a tool turret, it is also possible to provide, for example, a milling spindle or drill spindle with a tool mount for the first and/or third tool carrier 61, 63.

Provided according to the invention, in the embodiment of FIG. 1, is a second tool carrier slide 52 which is arranged on the third tool carrier face WTS3 of the centre portion 1c and on which a second tool carrier 62 is arranged. The second tool carrier slide 52 can be moved in the vertical direction Y in FIG. 1 and in particular vertically to the spindle axes of the first and second work spindles 21 and 22.

In particular, the second tool carrier 62 is configured as a tool turret which is arranged between the first work spindle 21 and the second work spindle 22, and comprises a tool-carrying turret head 62 which is mounted rotatably about a turret axis. The axis of the turret head 62 is aligned in the X direction and thereby vertically to the spindle axes of the first and second work spindles 21 and 22, and the axis of the turret head 62 is also aligned vertically to the vertical direction Y, in which the second tool carrier slide 52 can be moved.

The turret head 62 has a plurality of mounts 3a, 3a' and 3a" (see for example FIG. 4) for receiving tool-holding tool holders 62a which, for their part, each hold tools T. The turret head 62 is configured as a radial turret head, the mounts 3a, 3a' and 3a" being arranged over the periphery of the turret head 62. The tool turret is arranged to align a mount 3a with one of the work spindles 21 or 22 by rotation of the turret head 62 about the turret axis, in order to align the tool T, held by the tool holder 62a accommodated on the mount 3a, with one of the work spindles 21 or 22.

Figure 4:
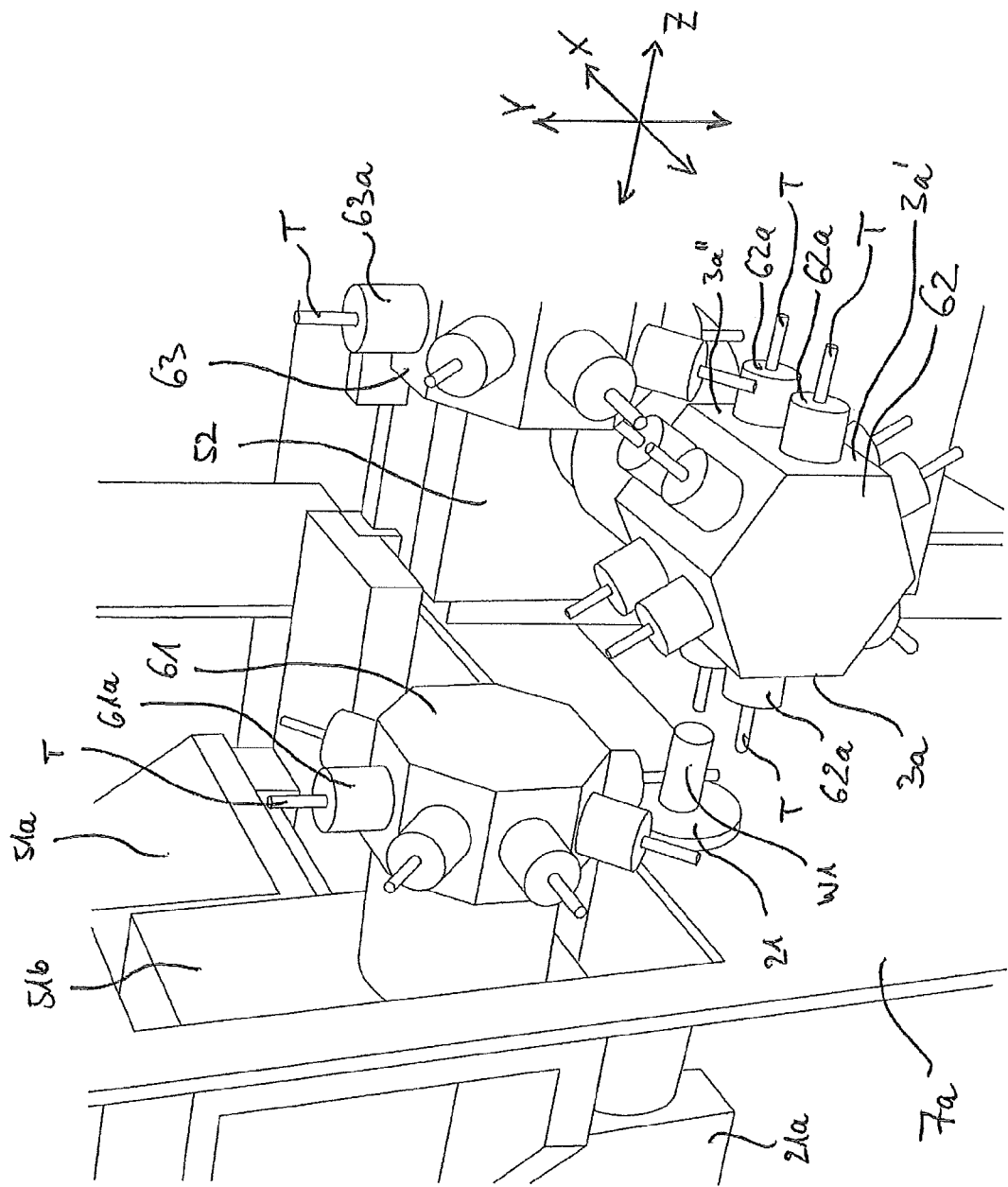
FIG. 4 shows by way of example a schematic illustration of a detailed view of the machining space of the machine tool according to the preferred embodiment of the present invention from FIG. 1.

As shown in FIGS. 1 and 4, the mounts 3a, 3a' of the turret head 62 are arranged in pairs on opposite sides of the turret head 62, so that the tool holders 62a are arranged in pairs on opposite sides of the turret head 62, more specifically such that in each case a first mount 3a' with tool holder 62a accommodated therein is aligned with the second work spindle 22 when another, opposite second mount 3a with tool holder 62a accommodated therein is aligned with the first work spindle 21.

This allows an advantageous simultaneous alignment of tools T on both work spindles 21 and 22 with just the one tool turret with turret head 62. In FIG. 1, for example, a machining tool T1 is aligned with the workpiece W1 received in the first work spindle 21 and an opposite machining tool T2 is aligned with the workpiece W2 received in the second work spindle 22. It is thus possible for the workpieces T1 and T2 to be machined simultaneously by the tool turret 62.

Furthermore, in the case of the machine tool according to FIG. 1, machining space walls 7a and 7b are provided which are arranged on machining space faces (see for example BS1 in FIG. 1) of the carrier portion 1, which machining space faces extend between the spindle carrier faces STS1 and STS2 of the carrier portions 1a and 1b and of the third tool carrier face WTS3 of the centre portion 1c.

The machining walls 7a and 7b advantageously form a machining space between the carrier portions 1a and 1b of the machine frame 1. Furthermore, the machining walls 7a and 7b extend vertically upwards and horizontally forwards beyond the body of the machine frame.

In this respect, the machining walls 7a and 7b have openings to the machining space, through which the first and second work spindles 21 and 22, the first tool carrier 61 and the third tool carrier 63 extend into the machining space. Advantageously, this makes it possible to protect the housings 21a and 22a of the work spindles and the first and third tool carrier slides 51 and 53 against chips from the machining space, without necessitating expensive protective covers for the slides and housings.

Figure 3:
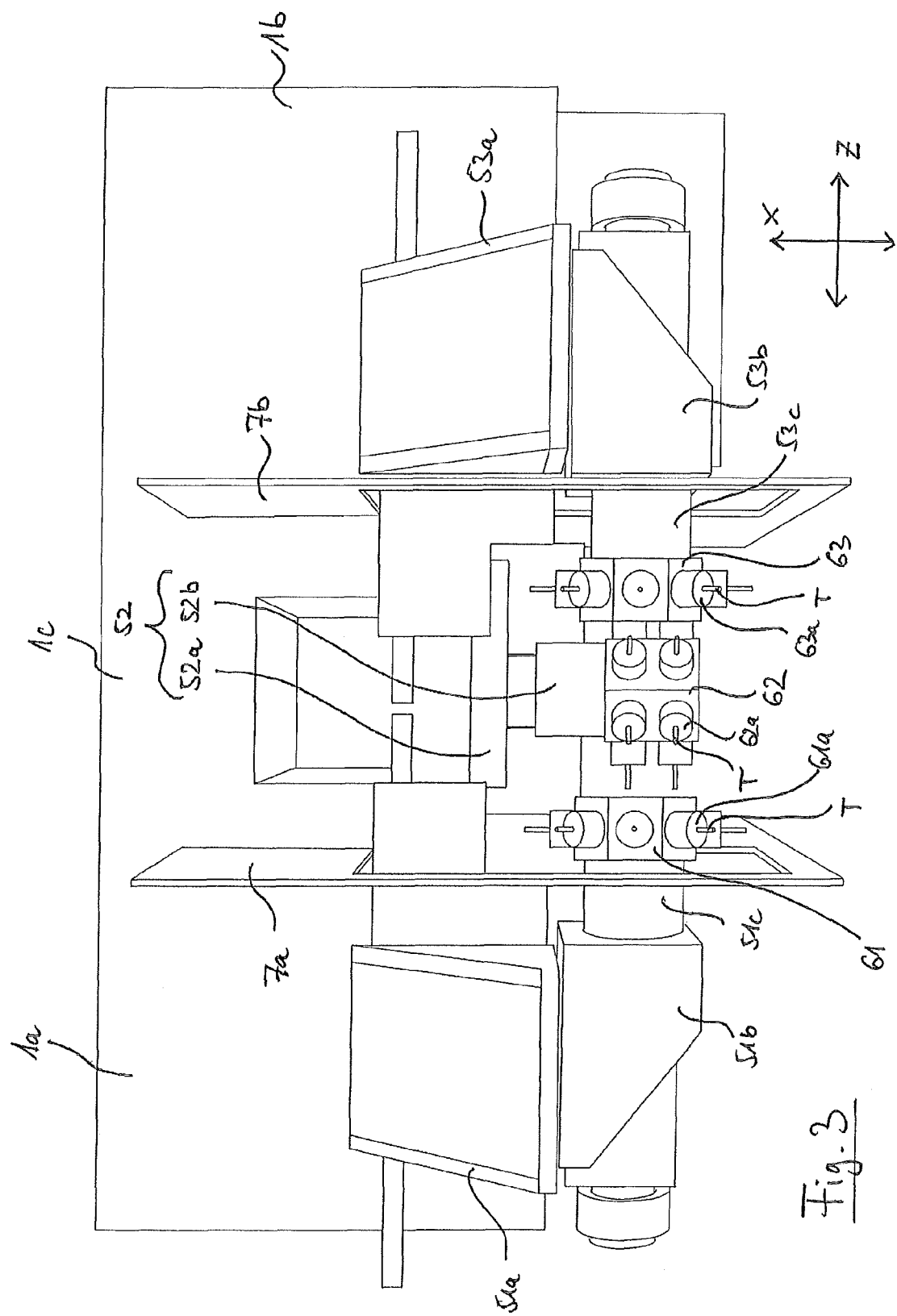
FIG. 3 shows by way of example a schematic illustration of a plan view of the machine tool according to the preferred embodiment of the present invention from FIG. 1.

FIG. 3 shows by way of example a schematic illustration of a plan view of the machine tool according to the preferred embodiment of the present invention from FIG. 1.

FIG. 3 shows that, in this embodiment, the first and third tool carrier slides 51 and 53 are configured as compound slides, a first respective partial slide 51a and 53a being arranged such that they can move in direction Z of the spindle axes on the respective tool carrier face WTS1 or WTS2 of the respective carrier portion 1a and 1b. Arranged, in turn, on the first respective partial slide 51a and 53a are respective movable partial slides 51b and 53b on which the tool turrets are mounted in each case on housings 51c and 53c, such that they rotate about turret axes which extend parallel to the spindle axes. In this respect, the housings 51c and 53c can comprise drives for controlling the turrets and are also used to extend into the machining space from the partial slides arranged next to the spindle housings 21a and 22a (seen relative to the spindle axes), such that the tool carriers 61 and 63 can be arranged in the machining space next to the spindles 21a and 22a (seen relative to the spindle axes). In this embodiment, the second partial slides 51b and 53b can be moved vertically to the spindle axes, particularly in the same direction Y as the second tool carrier slide 52, i.e. for example in a vertical direction in this embodiment.

FIG. 4 shows by way of example a schematic illustration of a detailed view of the machining space of the machine tool according to the preferred embodiment of the present invention from FIG. 1.

FIG. 4 shows that, according to this embodiment, the tool turret 62 is configured as a double turret head, each side of the turret head 62 having at least two mounts 3a' and 3a" which are arranged next to one another in each case in direction X of the turret axis.

According to this embodiment, to align the tools T when the work spindles are coaxial, the turret head 62 can be moved in direction X of the turret axis, such that the tool turret is arranged to align a first or second mount 3a' or 3a" of one side of the turret head with one of the work spindles 21 or 22 by moving the turret head 62 in direction X of the turret axis. In this respect, a telescopic axial unit 52b, arranged on the tool carrier slide 52a, can be provided such that the turret head 62 can be moved in direction X by this telescopic axial unit 52b (see FIG. 3).

To summarise, the present invention makes it possible to improve a generic type of machine tool such that it is possible to efficiently machine the workpieces with as many tools as possible which can be used as far as possible at the same time, with the greatest possible flexibility in respect of the control of the relative movements between the tools and the tools received in the work spindles, at the same time with a compact construction of the machine tool and with a machining space which affords the machinist with the best possible visibility.

The invention claimed is:

1. A machine tool comprising:
a machine frame with a first carrier portion, a second carrier portion and a centre portion arranged between the first and second carrier portions,
wherein the first carrier portion has a first tool carrier face, the second carrier portion has a second tool carrier face and the centre portion has a third tool carrier face, and
wherein the first tool carrier face of the first carrier portion and the second tool carrier face of the second carrier portion are arranged on a same first face of the machine frame, and the third tool carrier face of the centre portion is arranged on a second face of the machine frame arranged substantially vertically or obliquely to the first face of the machine frame;
a first work spindle which is arranged on the first carrier portion and is to receive a first workpiece;
a second work spindle which faces the first work spindle, is arranged on the second carrier portion and is to receive a second workpiece,
wherein the spindle axis of the second work spindle is aligned parallel and coaxially to the spindle axis of the first work spindle;
a first tool carrier slide which is arranged on the first tool carrier face of the first carrier portion or on the second tool carrier face of the second carrier portion and on which a first tool carrier is arranged; and
a second tool carrier slide arranged on the third tool carrier face of the centre portion and on which a second tool carrier is arranged,
wherein the second tool carrier slide can be moved in a first direction transversely to the spindle axes of the first and second work spindles,
wherein the second tool carrier is configured as a tool turret which is arranged between the first work spindle and the second work spindle and comprises a tool-carrying turret head mounted rotatably about a turret axis, and
wherein the turret axis is aligned transversely to the spindle axes of the first and second work spindles.

2. The machine tool of claim 1 wherein the turret axis is furthermore aligned transversely to the first direction of the second tool carrier slide.

3. The machine tool of claim 1 wherein the turret head has a plurality of mounts for receiving tools or tool-carrying tool holders, the tool turret being arranged to align a mount with one of the work spindles by rotation of the turret head about the turret axis.

4. The machine tool of claim 3 wherein the mounts are arranged at least to some extent in pairs on opposite sides of the turret head such that at least one mount is aligned with the second work spindle when an opposite mount is aligned with the first work spindle.

5. The machine tool of claim 3 wherein the mounts are arranged in pairs on opposite sides of the turret head such that a respective mount is aligned with the second work spindle when another opposite mount is aligned with the first work spindle.

6. The machine tool of claim 1 wherein the turret head is configured as a radial turret head, the mounts being arranged over the periphery of the turret head.

7. The machine tool of claim 1 wherein the turret head is configured as a double or multiple-turret head, each side of the turret head having at least two mounts which are arranged next to one another in direction of the turret axis.

8. The machine tool of claim 7 wherein the turret head can be moved in direction of the turret axis such that the tool turret is arranged to align a first or a second mount of one side of the turret head with one of the work spindles by moving the turret head in direction of the turret axis.

9. The machine tool of claim 1 wherein the first and/or second work spindle can be moved in direction of the spindle axes.

10. The machine tool of claim 1 wherein the second tool carrier slide is guided on guide means that are fastened on the third tool carrier face of the centre portion of the machine frame and are aligned in the first direction.

11. The machine tool of claim 1 wherein the first tool carrier slide is arranged on the first tool carrier face of the first carrier portion, and wherein the machine tool comprises a third tool carrier slide which is arranged on the second tool carrier face of the second carrier portion and on which a third tool carrier is arranged.

12. The machine tool of claim 11 wherein the first and/or third tool carrier slide can be moved parallel and/or transversely to the spindle axes.

13. The machine tool of claim 11 wherein the first and/or third tool carrier can be moved in the first direction transversely to the spindle axes and/or can be moved in a second direction transversely to the first direction and transversely to the spindle axes.

14. The machine tool of claim 11 wherein the first and/or third tool carrier is configured as a tool turret which comprises a tool-carrying turret head mounted rotatably about a turret axis aligned parallel to the spindle axes.

15. The machine tool of claim 1 wherein the first tool carrier face of the first carrier portion and the second tool carrier face of the second carrier portion substantially span a first plane, and a first spindle carrier face of the first carrier portion which supports the first work spindle and a second spindle carrier face of the second carrier portion which supports the second work spindle substantially span a second plane, the first plane being aligned substantially vertically to the second plane.

16. The machine tool of claim 15 wherein the third tool carrier face of the centre portion substantially spans a third plane, the third plane being aligned parallel to the second plane, the third plane being indented towards the machine frame relative to the second plane.

* * * * *